United States Patent Office 3,449,281
Patented June 10, 1969

3,449,281
WATER DISPERSIBLE EPOXY COMPOSITIONS
Philip W. Sullivan, Heusy-Verviers, Belgium, and Robert Wong, Newark, Ohio, assignors to Owens-Corning Fiberglas Corporation, Toledo, Ohio, a corporation of Delaware
No Drawing. Continuation-in-part of application Ser. No. 360,417, Apr. 16, 1964. This application June 20, 1966, Ser. No. 558,609
Int. Cl. C08g 53/18, 45/00; D06m 15/14
U.S. Cl. 260—292       16 Claims

ABSTRACT OF THE DISCLOSURE

A method of dispersing a resinous material in water, wherein a resinous material is mixed with at least 1% by weight of an aqueous soluble compound having the following formula:

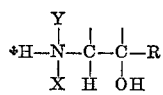

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule having a molecular weight up to approximately 10,000 and devoid of the terminal group given above at its other end; and wherein the mixture is blended with water.

---

The present application is a continuation-in-part of application Ser. No. 360,417, filed Apr. 16, 1964, and now abandoned.

The present invention relates to water soluble resins which will carry non-soluble resins into solution, and more particularly to aqueous dispersions of resins which contain a conventional insoluble resin in combination with a solubilized epoxy resin derivative.

The multitude of demands for resinous materials and the advance of polymer technology have recently resulted in the expansion of the use of epoxy resins from nil to an annual consumption which may be measured in tens of millions of pounds. However, despite such demands, technological versatility, and the commercial availability of a large number of epoxy resins, the latter do not include water soluble epoxy resin systems nor water emulsifiable compounds which are productive of a stable aqueous emulsion. In addition to the instability and fleeting "pot-life" of such aqueous emulsions which may be formed, the necessity for the presence of emulsifiers or emulsifying agents in the system serves to diminish or dilute the desirable properties of the epoxy resin and consequently to degrade the ultimate product which is formed from such aqueous emulsions.

As a consequence, present utilizations of epoxy resins are restricted to solutions employing anhydrous solvents such as toluene, xylene, methyl alkyl ketones and alcohols such as methyl isobutyl ketone or methyl amyl alcohol, alkylene glycol alkyl ethers such as ethylene glycol monobutyl ether, etc., or aqueous emulsions which are unstable, plagued by extremely limited pot-lives, and attended by the adulteration of the properties of the epoxy resin. The same conditions exist with other high molecular weight insoluble resins such as polyesters, polyurethanes, polyacrylates, etc.

Accordingly, the vast majority of applications for epoxy and other insoluble resins involve the utilization of anhydrous solvents and the requisite limitation to such systems is fraught by a number of detriments and deleterious aspects. In the first instance, the utilization of such solvents entails substantial expense in terms of materials, processing, apparatus, and necessary precautions, as a result of the flammability and toxicity of these materials. For example, in the application of industrial epoxy coating, such as primer coatings for automobile bodies, explosive and toxic fumes must be vented to safeguard both personnel and the installation. Such precautions involve the necessity for venting and exhaust equipment, greatly increased insurance premiums and the dissipation of costly materials. Even if solvent recovery systems are employed, total solvent recovery is not achieved and the expense of such apparatus and its operation is substantial. In addition, the complete removal or volatization of solvents such as toluene, xylene and methyl isobutyl ketone from epoxy systems entails temperatures in the range of 230–290° F. as contrasted to the lower temperatures at which water may be dispelled.

Consequently, it may be seen that despite the extensive advancement of the area of high molecular weight resin technology, a glaring deficiency exists in its present status, i.e. the provision of suitable aqueous solution and emulsions of such resins.

It is an object of the present invention to provide aqueous dispersions of epoxy and/or other high molecular weight resins.

Another object is the provision of aqueous solutions of epoxy and/or other high molecular weight resins.

A further object is the provision of unusual aqueous emulsions of epoxy and/or other high molecular weight resins.

An additional object is the provision of methods for rendering epoxy and/or other high molecular weight resins dispersible in an aqueous medium.

Still another object is the provision of coating materials comprising aqueous dispersions of epoxy resins.

Another object is the provision of a method for coating glass fibers with unusual coatings during their formation by attenuation.

The term "aqueous dispersion" as used herein is intended to connote and encompass both solutions and dispersions and may be defined as a suspension of colloidal or larger particles of a liquid or solid epoxy and/or other high molecular weight resin in an aqueous phase or medium.

The term "epoxy resin" as used herein, is intended to connote and encompass those resins which may be defined as polyethers containing terminal oxirane groups which are separated by alternating aromatic and/or aliphatic radicals.

The foregoing objects are achieved by means of combining a conventional epoxy and/or other high molecular weight resin or resins with an epoxy resin which has been modified to render it water soluble, and dispersing the combined resins in an aqueous phase.

The modified epoxy resin comprises the acid salt of the reaction product of an epoxide composition containing one or more oxirane groups, and a primary or secondary monoamine which contains at least one hydroxy substituent.

I. PREPARATION OF THE MODIFIED WATER SOLUBLE EPOXY COMPONENT

In the preparation of the epoxy-amine reaction product which is subsequently transformed to the corresponding acid salt, the reaction is calculated to yield a reaction product of a terminal oxirane group and an amine group, rather than a composition in which oxirane or epoxide groups at both ends of the molecule are expended through reaction with the amine. The reaction referred to is that in which a hydrogen atom attached to link the amine to one of the two carbon atoms which comprises the oxirane ring, with the formation of a hydroxy group attached to the other carbon atom of the oxirane ring. Such a reaction may be generally depicted as follows:

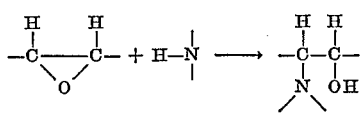

To achieve the desired reaction product and to insure that an oxirane group at one end of the molecule, only, is reacted, the amine and epoxy reactants are reacted in a less than stoichiometric ratio, i.e. less than one mol of active amine hydrogen for each mol of oxirane oxygen. Expressed differently, a quantity of the amine reactant which is adequate to render the final reaction product water soluble, but inadequate to react with every oxirane group where more than one is present, is employed in the conduct of the reaction. In reactions involving epoxy compounds containing between 2 to 8 oxirane rings it has been found that the reaction of only one of the oxirane groups with one mol of active amine hydrogen, is adequate to yield the desired water solubility, and will carry other nonsoluble molecules into solution with it.

The reaction of the epoxide compound and the amine may be achieved at moderate conditions and during relatively short reaction periods. For example, a glycidyl ether of bis phenol A and epichlorohydrin and diethanolamine may be suitably reacted at a temperature of 100° C. in a period of one hour. The reaction is preferably conducted in a reaction medium such as diacetone alcohol, although other media such as isopropanol, acetone, toluene, chlorinated hydrocarbons, and the like may also be employed.

The epoxide-amine condensation product derived from the foregoing reaction is then solubilized through the formation of its corresponding acid salt. For such solubilization, either organic or inorganic acids are suitable, as demonstrated by the fact that the epoxy-amine reaction product has been suitably solubilized through the formation of the corresponding salts of acetic, lactic, phosphoric, hydrochloric and sulfuric acids.

In preparing the salt, the acid may be added to the admixture of reaction product and reaction medium until a pH slightly on the acid side is attained. The salt may then be maintained in admixture during storage, or the admixture may even be maintained during final use if the reaction medium is deemed innocuous in such use. For example, when toluene is employed as the reaction medium, acidified water may be added to dissolve the reaction product and form the acid salt which may then be removed upon phase separation. Alternatively, the reaction product may be formed in a reaction medium in which it is soluble, i.e. diacetone alcohol, acid may be added to form the salt, and an aqueous solution may be formed when desired through the mere addition of water.

As previously stated, the compounds which are susceptible to the foregoing solubilization techniques are resinous epoxide compounds which may be defined as polyethers containing terminal oxirane groups which are separated by alternating aromatic and/or aliphatic radicals, and which contain at least one oxirane group per molecule. Included among such compounds are the glycidyl ethers of phenols such as the reaction product of epichlorohydrin and bis phenol A, or substituted phenols such as the methyl phenols, e.g. o-cresol, or halogenated phenols, the glycidyl ethers of condensation products of polyhydric phenols and aldehydes, such as the novolac epoxides, the epoxidized polydienes such as epoxidized polybutadiene, polyesters, polyurethanes, polyacrylates, polyvinyl chloride, polyethylenes, polypropylenes, etc.

Structural formulae of various types of epoxides which have been satisfactorily aminated and solubilized, are as follows:

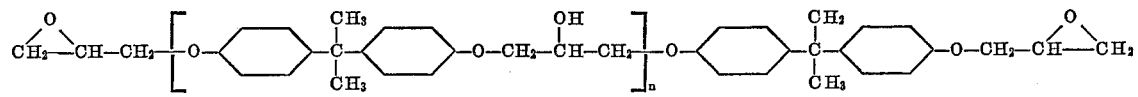

B. Glycidyl Ethers of Phenol-Aldehyde Condensates

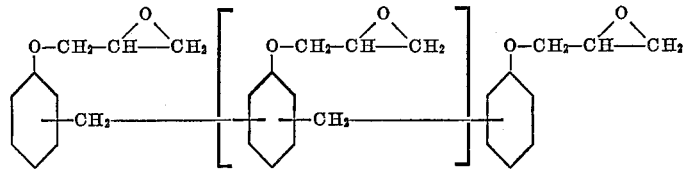

C. Epoxodized Polyalkadienes

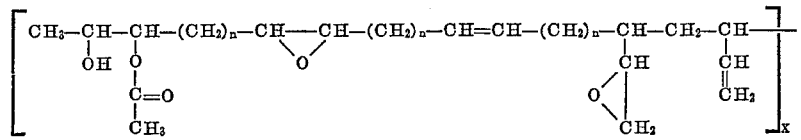

Specific compositions of the foregoing general types, include the following:

(1)

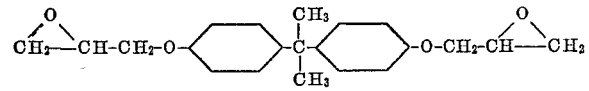

(2)

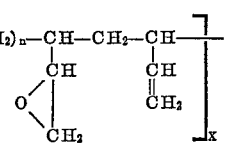

(3)

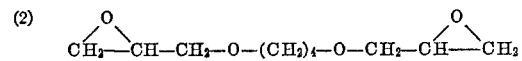

(4)

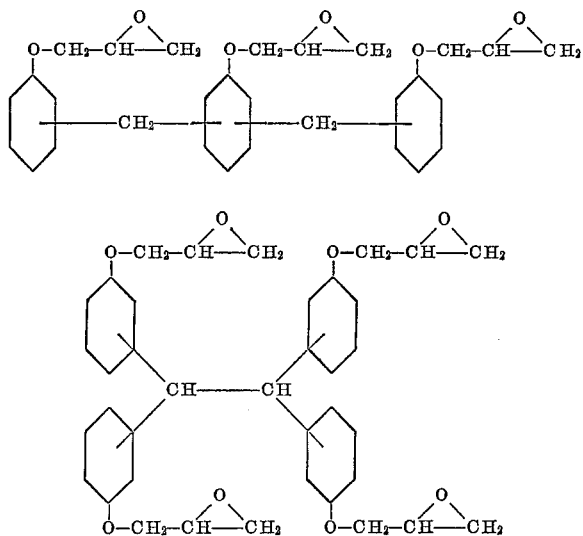

The amine compound which is reacted with the foregoing epoxy compounds may be described as a primary or secondary monoamine having at least one valence of the nitrogen atom satisfied by an aliphatic radical containing at least one hydroxy group, as is depicted by the following formula:

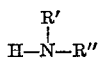

wherein H is hydrogen, R' is an aliphatic hydrocarbon radical containing at least one hydroxy group, and R'' is hydrogen, an aliphatic hydrocarbon radical containing at least one hydroxy group, or an alkyl group having no more than 6 carbon atoms.

More specifically, the amine compound containing the aliphatic hydrocarbon radical, or radicals, having at least one hydroxy group, may be illustrated by the formula:

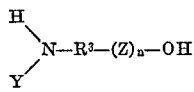

wherein $R^3$ is an aliphatic hydrocarbon radical having no more than 6 carbon atoms, and including:

(1) The alkanol and dialkanol amines, and their isomers, when $n$ is 0, e.g. ethanolamine, n-propanolamine, butanolamine, diethanolamine, methyl amino ethanol, ethyl amino ethanol, isopropanolamine, di(iso)propanolamine, 2-amino-1-butanol, and the like, (2) Amino ethers and alkylene oxide condensates when Z is an ether group, e.g. —O—R— group with R being a divalent hydrocarbon radical having less than 6 carbon atoms, and $n$ having a value of less than 25, e.g. 2-amino ethyl, 2-hydroxy ethyl ether, polyoxyethylene amines, polyoxypropylene amines, and the like, (3) Polyhydric alcohol condensates, hydroxy alkyl amines and amino alkanediols, when Z is an R—OH or R(OH)$_2$ group, e.g. 1,2,3,4,5,6-hexahydroxy amine, tris (hydroxymethyl) aminomethane, 2-amino-2-methyl 1,3-propanediol, and the like.

Suitable amine reactants are set forth in Table I below:

TABLE I

| $\begin{matrix}H\\ \phantom{x}\diagdown\\ \phantom{x}N\text{—}R\text{—}(Z)_n\text{—}OH\\ \phantom{x}\diagup\\ Y\end{matrix}$ | | | | Representative types of compounds |
|---|---|---|---|---|
| Y | R | (Z) | n | |
| Hydrogen, alkyl or one of the Z radicals | An aliphatic hydrocarbon radical having no more than 6 carbon atoms | — | 0 | (a) Alkanolamines: Ethanolamine. n-Propanolamine. Butanolamine. (b) Alkyl alkanolamines: Methyl amino ethanol. Ethyl amino ethanol. (c) Dialkanolamines: Diethanolamine. Di(iso)propanolamine. (d) Isomers: Isopropanolamine. 2-amino-1-butanol. |
| | | —O—R— | 1–25 | (a) Amino ethers: 2-amino ethyl. 2-hydroxyethyl ether. (b) Alkylene oxide condensates: Polyoxyethylene amine. Polyoxypropylene amine. |
| | | $\begin{matrix}OH\\ \vert\\ -R-\\ \vert\\ H\end{matrix}$ or $\begin{matrix}OH\\ \vert\\ -R-\\ \vert\\ OH\end{matrix}$ | 1 | (a) Polyhydric alcohol condensates: 1,2,3,4,5,6-hexahydroxy amine. (b) Hydroxy amines: Tris(hydroxymethyl)aminomethane. 2-amino-2-methyl 1,3-propanediol. |

The preparation of the water soluble acid salt of such amine-epoxide condensates is set forth by Examples 1–15 which follow:

Example 1

To 371 parts by weight of diacetonealcohol were added 105 parts by weight of diethanolamine and 371 parts of a diepoxide having the formula:

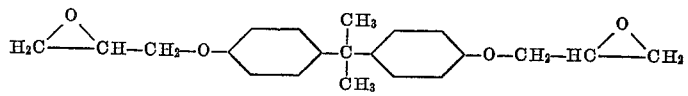

The diacetone alcohol and diepoxide were admixed and maintained at 100° C. and the diethanolamine slowly added thereto over a period of an hour with thorough mixing during addition of the diethanolamine. Acetic acid was then added to the mixture until a pH of 7 was achieved. The resultant product comprised a pale yellow liquid which was stored at room temperature for a period of over one month and proved capable of dissolution in warm water after such storage. In addition, the reaction product, together with the reaction medium phase, i.e. diacetone alcohol, was employed in the preparation of an aqueous solution from which films were cast and dried upon glass plates, and which are utilized as a forming size composition for glass fibers. The cast films exhibited remarkable clarity, durability, and abrasion and moisture resistance. The glass fibers which were sized at forming with the solution of the epoxide-amine salt, possessed unusual strengths, resistance to the harmful effects of mutual abrasion, and compatibility with both epoxy and polyester impregnating resins.

Example 2

The process of Example 1 was repeated with the substitution of 105 parts by weight of diethanolamine and 742 parts of an epoxide having the formula:

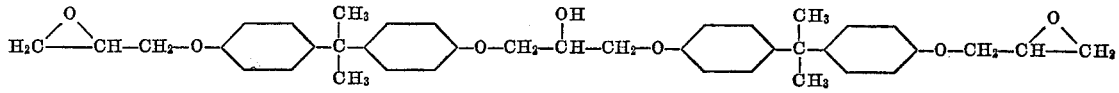

Example 3

The method of Example 1 was repeated with the substitution of 48.3 parts by weight of diethanolamine and 249 parts of an epoxide having the formula:

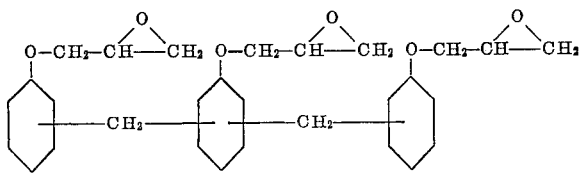

Example 4

The method of Example 1 was repeated with equimolar proportions of diethanolamine and an epoxide having the formula:

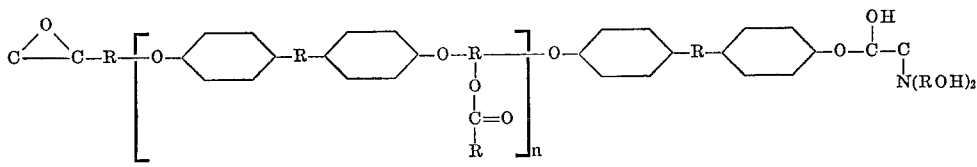

Example 5

To 186 parts by weight of diacetone alcohol were added 105 parts by weight of diethanolamine and 186 parts by weight of a diepoxide having the formula:

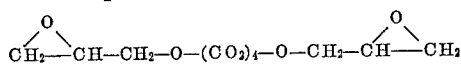

The foregoing ingredients were admixed and maintained at 100° C. for a period of one hour.

Example 6

To 354 parts by weight of diacetone alcohol were added 105 parts by weight of diethanolamine and 354 parts by weight of epoxidized polybutadiene having a specific gravity of 1.01 (at 25° C.), a viscosity of 1800 poises (at 25° C.), an epoxy percent of 9 and an epoxy equivalent (number of grams of resin containing one gram mol of epoxide) of 177.

The foregoing ingredients were admixed and maintained at 100° C. for a period on one hour.

Example 7

The method of Example 1 was repeated with 68 parts by weight of ethanolamine and 217 parts by weight of the diepoxide of Example 1.

Example 8

The method of Example 1 was repeated with 450 parts by weight of the diepoxide of Example 1, 450 parts by weight of diacetone alcohol and 73.5 parts by weight of an hydroxy amine having the formula:

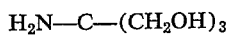

It has also been found that epoxide reacted with modifying compositions such as fatty acids and the like, for the purpose of achieving improved leveling, chemical and/or thermal properties, may also be solubilized by the inventive methods. For example, epoxides have been reacted with oleic or stearic acids, then subjected to the prescribed reaction with a monoamine, and ultimately acidified. Such compounds exhibited the same pronounced degree of water solubility which was previously described. It is believed that the modifying compound, e.g. fatty acid, reacts with a hydroxyl group derived from the splitting of an oxirane group during polymerization. In turn, the subsequently reacted amine links withh an oxirane group to yield a composition of the following general type:

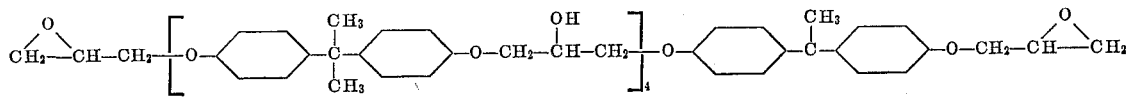

Example 9

A coating material comprising a long chain molecule having a single solubilizing group at one end, and which is devoid of oxirane groups, is illustrated by the following formula:

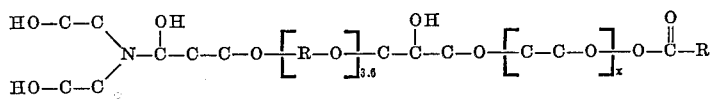

This material is prepared by dissolving approximately 1,670 parts by weight of the general type of epoxide of Example 5 but having an "n" of 3.6 with 900 parts by weight of xylene in a two liter Pyrex reactor kettle having a motor driven agitator therein, and surrounded by a Glas Col heated mantel controlled by a Variac. The vessel is suitably closed off, and is provided with a reflux condenser to prevent the escape of solvents and/or reactants. The mixture is heated to 105° C. with stirring to thoroughly dissolve the resin, and thereafter the temperature is raised to 120° C. and approximately 137 parts by weight of diethanolamine is added slowly with continuous mixing. The products are held at 120° C. for four hours to provide ample time to react all of the amine. The material produced by the above reaction was essentially that of Example 5 above and contains a preponderance of molecules having a single terminal solubilizing group at one end.

Thereafter a polyglycol, as for example a polyglycol monooleate is added and reacted with the remaining oxirane groups. Approximately 893 parts by weight of Carbowax 400 (a commercially available polyglycol-monooleate having a molecular weight of 400) is added to the reaction kettle using 5.72 parts by weight of a basic catalyst, (as for example potassium hydroxide) and the mixture heated to maintain 120° C. for four hours. The resulting material has an epoxy equivalent of 3,000 indicating one epoxy equivalent for 3,000 grams of the material and had excellent shelf life. Samples of this material have been stored at room temperature for four months without appreciable thickening or rise in molecular weight. By reacting the polyglycols for longer periods, higher numerical value of epoxy equivalent can be obtained, and this may be economically justified where even greater shelf life is necessary.

Example 10

A material having the following formula was prepared using the same method described in Example 9, but using the following materials in the parts by weight indicated:

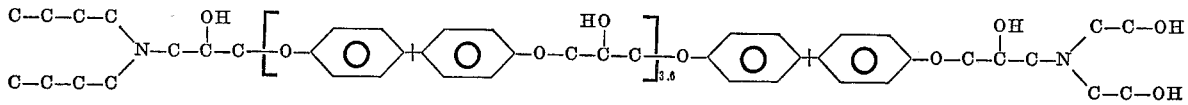

Epoxy resin of Example 9 _____ 1,250
Diacetone alcohol _____ 1,250
Diethanolamine _____ 105
Dibutylamine _____ 129

The diethanolamine and the diepoxide is reacted for two hours at 100° C. The product of this reaction is then cooled to 73° C. The dibutylamine is added and refluxed at 100° C. for two hours. The final material had an epoxy equivalent of infinity, indicating no substantial remaining oxirane groups. The percent solids was 54.19, the viscosity at 25° C. was 1,570 centipoise, and it had a medium amber color. The material is as water soluble as are the materials of Examples 4 and 9 and makes an excellent coating.

Example 11

The material having the following formula was prepared in generally the same manner as was that of Example 9 excepting that no diethanolamine was used:

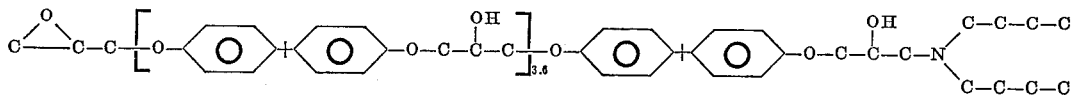

Example 12

A material having the following formula was prepared using the same general procedure indicated in Example 4 above using approximately 833 parts by weight of the diepoxide of Example 9, approximately 833 parts by weight in diacetone alcohol, and approximately 42 parts by weight of butyl monoethanolamine:

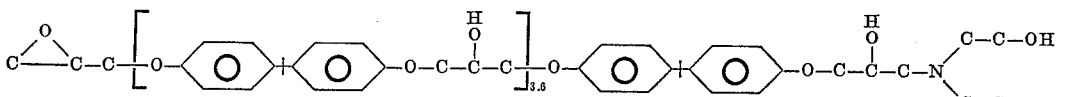

The resulting material has an epoxy equivalent of 823, has 51.33 percent solids, and a viscosity of 325 centipoise at 25° C. The resin material is clear to a light amber color, and can be solubilized in water when acidified, although it dissolves more slowly than does the material of Example 4.

Example 13

A material having the following formula is prepared using the same general procedure given in Example 9 above using the following materials: 746 parts by weight of the diepoxide of Example 9, 330 parts by weight of xylene, 172 parts by weight of 1-octadecanol, 64 parts by weight of diethanolamine, and 3 parts by weight of potassium hydroxide:

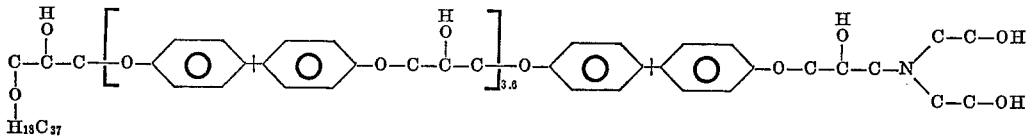

The resin is dissolved in xylene at 100° C., it is then cooled to 35° C. and the diethanolamine added. It is heated to and held at 120° C. for one hour following which a mixture of 1-octadecanol and potassium hydroxide is added and the mixture is held at 120° C. for four hours. The material when cooled has a paste like consistency with some crystal like appearance at its surface. It has an epoxy equivalent of 1,893, and when acidified, it is water soluble.

Example 14

A ureaformaldehyde resin solubilized in the manner of the present invention is made by reacting 2.5 mol of formaldehyde with one mol of urea at a pH of 4.5 to 4.6 using phthalic anhydride, formic acid, or other materials to adjust the pH. The above materials are cooked at 90° C. for approximately one and a half hours to a Gardner Hope viscosity of G and a percent solids of 55 to 60. This material is not water soluble. Thereafter water is removed by subjecting the cook to vacuum until approximately 80% solids is reached. The material is cut with approximately 25 to 30% of xylene. This material is then reacted with one mol of an epoxide having the following formula:

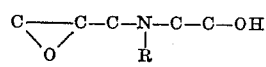

at approximately 100° C. for one hour to produce a material having the following formula:

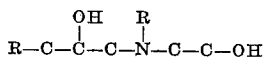

The epoxide is made by reacting butyl ethanolamine with epichlorhydrin as is well known. The final product is

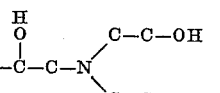

water soluble when acidified, and is a good coating material when applied from an aqueous solution.

Example 15

A polyester material having the following formula is prepared using the same general procedure of Example 13:

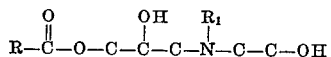

Wherein R is the long chain molecule of a polyester exclusive of a carboxyl group and $R_1$ is a butyl group. The material is prepared by reacting the polyester with the epoxy of Example 14 in an organic solvent such as xylene at 100° C. for one hour or more using reflux. The resulting material when acidified is water soluble and makes a good coating material.

All of the reaction products of Examples 1–15 are water soluble and in many instances retain such solubility during storage at room temperatures for periods in excess of a month. However, since these compositions are capable of progressive cross-linking to an ultimate set condition, refrigeration is desirable when prolonged storage is contemplated.

II. PREPARATION OF THE AQUEOUS DISPERSIONS

As previously discussed, aqueous solutions and emulsions of epoxy and/or other high molecular weight resins which normally are insoluble in water, difficult to disperse as an emulsion in water, or productive of unstable emulsions requiring the presence of emulsifiers, may be prepared through combining such resins with the foregoing water soluble salts of epoxy-amine condensates.

The epoxy compounds which are susceptible to such conversion to a water soluble or water emulsifiable form, are those set forth above. In the case of the epoxy resins which are combined with the water soluble epoxy-amine condensates, the number of oxirane groups is immaterial.

In essence, the inventive compositions and methods may be generally described as water soluble or water emulsifiable compositions containing:

(a) A conventional epoxy and/or other high molecular weight resin, and (b) The water soluble acid salt of an epoxy-amine condensate, or as methods for the conversion of conventional epoxy and/or other high molecular weight resins to a condition in which they are readily dispersible in water to form aqueous emulsions or solutions, and basically comprising the combining of such conventional epoxy resins with water dispersible modified epoxy compounds.

Basically, the issue of whether an epoxy system which is water soluble or water emulsifiable is formed, is dependent upon the ratio of conventional epoxy to epoxy-amine condensate, which is utilized. In turn, this ratio is dependent upon the resistance of the conventional epoxy and/or other high molecular weight resin to dissolution or emulsification, and upon the degree of solubility of the epoxy-amine condensate. Since these characteristics vary for each conventional resin and for each condensate, a general ratio cannot be provided. For example, it may be generally stated that when the modified epoxy-amine compound preponderates, or is present in a substantial quantity, e.g. comprises 40% by weight or more of the combination, a water soluble system is derived. In contrast, when the modified epoxy-amine condensate is present in minor quantities, e.g. less than 40% by weight, a system which is capable of yielding an aqueous emulsion of unusual stability is realized. However, these must be accepted as general rules in that certain of the modified compounds, e.g. the product of Example 7, are not as readily dispersible in water as others, and consequently must be employed in larger quantities in order to yield either an aqueous solution or an aqueous emulsion. In contrast, some of the convertional epoxy compounds are more resistant to emulsification or dissolution and accordingly require a larger proportion of the modified epoxy-amine additive, e.g. at least 70% by weight to form a water soluble system, and at least 50% by weight to form a water emulsifiable system.

Examples 16–19 which follow set forth aqueous solutions and emulsions formed from various combinations of conventional epoxy compounds and water soluble epoxy-amine derivatives:

Example 16

Fifty parts by weight of the modified reaction product of Example 1 (based on active solids) were combined with 50 parts by weight of the conventional epoxide which was employed in Example 2. It should be noted that the latter epoxide had not been previously subjected to the reactions involved in Example 2. When 1900 parts by weight of water were added an aqueous emulsion of unusual stability was derived. When an additional 40 parts by weight of the reaction product of Example 1 were added an aqueous solution was achieved.

It should be noted that the first phase, or emulsification step, may be facilitated by means of the addition of acetic acid to the admixture of modified and conventional epoxy prior to its dispersion in water. This is a general proposition and is similarly applicable to the succeeding examples. The acetic acid is preferably employed in a quantity of from 0.15 to 0.30% by weight, based upon a 5% resin dispersion. While emulsions will result in the absence of such treatment, they are generally of a somewhat inferior nature. A similar improvement can be realized in preparing the inventive solutions, as well as in the preparation of emulsions.

Example 17

Thirty parts by weight of the reaction product of Example 3 were combined with 60 parts by weight of the epoxide employed in the reaction set forth in Example 1. Again, a highly stable emulsion was obtained upon the addition of 1900 parts by weight of water, and an aqueous solution resulted when an additional 30 parts by weight of the reaction product of Example 3 were added.

Example 18

Forty parts by weight of the reaction product of Example 5 were combined with 60 parts by weight of the unmodified epoxidized polybutadiene employed in the reaction of Example 6. A highly stable aqueous emulsion was obtained upon the addition of 1900 parts by weight of water, and the emulsion was converted to a solution upon the addition of a further 40 parts by weight of the reaction product of Example 5.

Example 19

Twenty parts by weight of the reaction product of Example 7 and 20 parts by weight of the reaction product of Example 8 were combined with 60 parts by weight of the diepoxide which was employed in the reaction set forth in Example 1, and 1900 parts by weight of water were added. The resultant aqueous emulsion was then converted to an aqueous solution upon the addition of 40 parts by weight of the reaction product of Example 8.

In foregoing Examples 16–19 the parts by weight of the reaction products of Examples 1–8 which are combined with the conventional epoxide compounds are the actual amine-epoxide salt reaction products. However, it should be noted that the reaction mixtures, i.e. reaction product and reaction medium, may be added if desired or if the separation or distillation of the reaction mixture is undesirable. The latter holds true regardless of whether the amine-epoxide salt and the conventional epoxide composition are soluble or insoluble in the reaction medium.

Examples 16–19 and 25–32 demonstrate that stable emulsions may be derived by adding between 10–50% by weight of the modified epoxide compounds to conventional epoxide and/or other high molecular weight resin compositions. Similarly, they show that solutions may be derived by adding between 50–65% by weight of the modified epoxides to the conventional epoxide and/or other high molecular weight resin compositions. However, as previously discussed, the limits of the solubilizing and emulsifying effects of these additives are not susceptible to precise definition and the examples are merely demonstrative of a suitable range within broader limits of operability. For example, it may be generally stated that between approximately 1–99% by weight of any of the inventive epoxy-amine compounds will serve to permit the water emulsification of any conventional epoxide and/ or other high molecular weight resin composition, and that between 30–99% by weight of any of these compounds will yield solutions of any conventional epoxide and/or other high molecular weight resin composition. However, it must be noted that this is not a precise expression in that the modified compounds possess varying powers of emulsification and solubilization and that conventional epoxide compositions exhibit varying degrees of resistance to solubilization and emulsification. However, it does serve to demonstrate that at least approximately 1% by weight of the modified compounds are required to render any conventional epoxide composition water-dispersible.

It is also important to note that the conventional epoxide compositions which are rendered water soluble or emulsifiable when inventively combined with the modified compounds, are neither water soluble nor emulsifiable in the absence of such combination. In the case of water solubility, none of the conventional epoxide compositions are soluble in the absence of the inventive treatment. In regard to water emulsification, aqueous emulsions of conventional epoxide compositions may be prepared by other, less desirable means. Specifically, aqueous epoxide emulsions have been previously prepared by means of emulsifiers, stabilizers, etc. However, such systems are possessed of limited stability and the ultimate epoxide product, e.g. coating, adhesive, etc., is deficient in that it incorporates extraneous or inferior components. For example, epoxides are generally selected for their abrasion and corrosion resistance, but the presence of emulsifiers and the like operate to dilute or degrade these properties. In addition, since such emulsifiers do not react with the epoxide compound the formation of a continuous film or phase is impaired or precluded. In contrast, the systems of the present invention permit an entirely epoxide end product which is possessed of the desired properties and characteristics, as well as providing a continuous epoxide phase or film. As more specific improvements, more economical, less hazardous epoxy systems are provided, which also yield an improved end product. It is obvious that the inventive systems provide a major advance in respect to epoxide compositions generally, and their use as coatings, adhesives, encapsulating compounds, filled and reinforced laminates such as filament wound structures, etc. However, these systems provide a distinct untility in the coating of glass fibers at forming.

In the first instance, glass fibers are plagued by attrition caused by mutual abrasion from the moment of their formation. As a consequence, protective coatings are applied to the fibers as soon as they are formed and before the individual filaments are brought into contact with one another in the form of a plural filament strand. In conventional practice the protective film-former may comprise a variety of compounds including starch, gelatin and synthetic resins. In view of the fact that the fibers are traveling at linear speeds in excess of 10,000 feet per minute at the time when the protective coating must be applied, the attainment of a continuous film is impossible with most coating media. To further complicate matters, the coating is applied a mere distance of inches from the fiber forming bushing which is maintained at a temperature in excess of 2000° F. and consequently yields an extreme hazard when coating solutions employing a flammable solvent are utilized. Toxic solvents also entail extensive problems in that venting the forming area causes air currents which tend to disrupt the fiber forming operation. As a consequence, such forming size compositions conventionally comprise aqueous emulsions which yield a discontinuous but adequate film. In the case of epoxy resins, which provide highly desirable protective coatings due to their abrasion resistance, solvent epoxy systems are preferred despite the attendant increased cost of manufacture and processing problems. The latter drawbacks are deemed preferable to the discontinuous and degraded film and the instability which are experienced in the use of conventional aqueous epoxy emulsions.

By means of the present invention, aqueous epoxide solutions and emulsions suitable for the coating of glass fibers are possible and productive of fibrous elements characterized by durability, abrasion resistance, high strengths and compatibility with impregnating resins in the fabrication of fibrous glass reinforced resin laminates and moldings.

Representative of such forming size compositions are the following:

Example 20

| | Percent by wt. |
|---|---|
| Conventional epoxy resin | 4.38 |
| Modified epoxide composition of Example 1 | 1.88 |
| Glacial acetic acid | 0.22 |
| Water | Remainder |

The conventional epoxy resin employed in the above formulation is the unmodified form of the same resin which was subjected to modification in Example 1 and is a liquid epoxy resin having an epoxide equivalent weight of 182–189, a viscosity of 4000–6400 centipoises (@ 25° C.), a maximum Gardner color of 3, and a specific gravity of 1.16 (@ 25° C.).

The above ingredients may be combined in any fashion although preferably the conventional and modified epoxy resins are admixed and the acetic acid and water (@ 100° F.) are added thereto with agitation.

It should be noted that if additional lubricity is desired, conventional forming size lubricants such as amine-fatty acid condensates, e.g. tetraethylene pentamine pelargonate or stearate, and ethylene oxide condensates of fatty acid amides may be merely added to the formulation, preferably in quantities in the range of .05–1% by weight of the total aqueous dispersion. However, it should be noted that such lubricity is not required in the majority of applications and that the present sized fibrous products are even suitable for weaving in the preparation of fabrics.

In addition, water repellants and compatibility enhancers such as organosilanes and Werner chromium complexes, e.g. methacrylato chromic chloride, may be added to the compositions in quantities in the range of 0.1–2% by weight of the total aqueous dispersion. Examples of suitable organosilanes are ethoxy silane, gamma methacryloxy propyl trimethoxy silane and 3,4 epoxy cyclohexylethyl trimethoxy silane, and the aminosilanes such as gamma amino propyl triethoxy silane.

Another suitable forming size composition contains the following ingredients.

Example 21

| | Percent |
|---|---|
| Conventional epoxy resin | 2.00 |
| Modified epoxide composition of Example 2 | 4.00 |
| Gamma methacryloxy propyl trimethoxy silane | 0.7 |
| Glacial acetic acid | 0.25 |
| Lubricant (ethylene oxide condensate of pelargonic acid amide) | 0.1 |
| Water | Remainder |

The conventional epoxy resin of the above example was the unmodified form of the epoxy resin subjected to modification in Example 3. Mix procedures were those described in Example 20 with the lubricant and organosilane added last.

Fibrous glass strands sized at forming with the compositions of Examples 13 and 14 demonstrated unusually high strengths both as strands and as reinforcements for synthetic resin matrices. These compositions yielded a high degree of compatibility with polyester, epoxy and diallyl phthalate resins and are generally suitable for the reinforcement of all synthetic resins. They demonstrate a pronounced utility for use in the filament winding of structures such as pipe, missile casings, etc., which are impregnated with an epoxy resin. In fact, in such applications these reinforcements yielded properties equal to those obtained with costly reinforcements prepared by the application of anhydrous solutions of epoxy resins to glass fibers at forming.

The compositions of Examples 20 and 21 were applied to glass fibers at forming by means of the method and apparatus disclosed by U.S. Patents 2,873,718, 2,693,429 or 2,744,563.

It should also be noted that the dispersability enhancing techniques of the present invention may also be employed to improve the dispersability of epoxide compounds in media other than water, e.g. methyl ethyl ketone, toluene, etc. It is also obvious that the quantity of water employed with the dispersible epoxide systems is readily determinable and dependent upon the particular conventional epoxide composition and modified epoxide compound which are employed.

In the foregoing sizing of glass fibers at forming it is desirable that the forming size compositions contain no more than 20% by weight of solids and preferably between 3 to 10% by weight of solids. In addition, the quantity of size solids applied to the glass fibers is normally between 0.25 to 7% by weight, based upon the total weight of the fibers and the dried residue of the forming size composition. However, when the fibers are intended for use in a filament winding operation in which a fully loaded or pre-pregged condition is desirable, the quantity of forming size solids may exceed 20% by weight.

As previously noted, organosilicon water repellants are often desirable as mere additives to the forming size compositions. However, it has also been found that highly desirable results are realized when the organosilicon compounds are reacted with either the modified epoxide composition or with the conventional epoxide compound. In such a system the organosilicon-epoxide reaction product demonstrates a pronounced affinity for the glass surface and provides a tough protective film at that site. In the preparation of these systems epoxy silanes such as glycidoxy propyl trimethoxy silane or epoxy cyclohexylethyl trimethoxy silane, or the aminosilanes such as gamma amino propyl triethoxy silane are preferred. The foregoing epoxy silanes may be defined as organosilicon compounds in which at least one of the silicon valences is satisfied by an aliphatic, aryl or cycloalkyl group which contains an oxirane ring and the remainder of the silicon valences are satisfied by hydrolyzable groups such as halogen or alkoxy groups. the aminosilanes may be defined as organosilicon compounds in which at least one of the silicon valences is satisfied by an amino alkyl group and the remaining valences are satisfied by hydrolyzable groups such as halogen or alkoxy groups.

In the reaction of the silanes and epoxide or modified epoxide compounds the reactants are preferably employed in an equimolar ratio.

It should be noted that the reaction of the aminosilanes and the conventional or the modified epoxy materials will proceed in the absence of catalysts and heat, but catalysts such as amines and boron trifluoride may be employed and are necessary in the case of the epoxy silanes.

The following examples illustrate epoxide-silane reaction products which are highly desirable for inclusion in forming size compositions for glass fibers:

Example 22

| | Parts by wt. |
|---|---|
| Epoxy resin | 100 |
| Glycidoxy propyl trimethoxy silane | 25 |
| Amine catalyst (mixture of diamines) | 12 |

The foregoing ingredients were maintained at a temperature of 300° F. for a period of one hour. The epoxy resin utilized was the diepoxide of Example 5 and it was employed in its unmodified form, i.e. not as the acid salt of its reaction with diethanolamine.

Example 23

| | Parts by wt. |
|---|---|
| Modified epoxy resin (reaction product of Example 5) | 100 |
| Glycidoxy propyl trimethoxy silane | 30 |
| Amine catalyst (mixture of diamines) | 14 |

The foregoing ingredients were admixed and reacted under the conditions specified in Example 15.

Example 24

| | Parts by wt. |
|---|---|
| Epoxy resin | 100 |
| Gamma amino propyl triethoxy silane | 25 |

The foregoing ingredients were admixed and maintained at a temperature of 150° F. for 30 minutes. The epoxy resin employed in this example was the unmodified glycidyl ether employed as a reactant in Example 2.

An equal weight of the reaction product of Example 22 was substituted for the 4.38% by weight of epoxy resin which was utilized in Example 20 and glass fibers were sized with the resultant composition at forming. Similarly, the reaction products of Examples 23 and 24 were substituted for the 1.88% of modified epoxide and the 4.38% of the conventional epoxy resin of Example 20, respectively, and the resulting compositions were employed to size glass fibers at forming. The fibers sized with these three compositions exhibited the ability to be impregnated thoroughly and rapidly by epoxy, polyester and diallyl phthalate resins and yielded unusually strong laminates.

Examples 25–32 demonstrate that stable solutions and/or emulsions may be derived by adding the epoxy-amine reaction product of an organic resin having a molecular weight of up to approximately 10,000 to any high molecular weight organic resin that is insoluble in water.

Example 25

Five parts by weight of the modified reaction product of Example 1 was mixed with 50 parts by weight of an insoluble polyester resin having a molecular weight of 6,000 and which was made by reacting equal molar quantities of ethylene glycol and maleic anhydride. When 1900 parts by weight of water were added, an aqueous emulsion of unusual stability was derived. When an additional 40 parts by weight of the reaction product of Example 1 were added an aqueous solution was achieved.

Example 26

Five parts by weight of the modified reaction product of Example 1 (based on actual solids) were combined with 50 parts by weight of a B-staged phenolformaldehyde resite. The resite was made by reacting 1.0 part of phenol with 5.2 parts of 52% formalin at a temperature of 60° C. for 5 hours. When 1900 parts by weight of water were added to the mixture, an aqueous emulsion of unusual stability was derived. When an additional 40 parts by weight of the reaction product of Example 1 were added, and aqueous solution was achieved.

Examples 27, 28, and 29

The processes of Examples 25, 26, and 16 were repeated using the reaction product of Example 10 in place of the reaction product of Example 1. In each instance when 5 parts of the modified reaction product was used, a stable emulsion was produced, and when 55 parts by weight of the modified reaction product was used, a solution was produced.

Examples 30, 31, and 32

The processes of Examples 25, 26, and 16 were repeated using the modified reaction product of Example 15 in place of the modified reaction product of Example 1. In each instance when 5 parts of the modified reaction product was used, a stable emulsion was produced, and when 55 parts of the modified reaction product were used, a solution was produced.

It will now be apparent that any high molecular weight, organic resin up to a molecular weight of approximately 10,000 having the epoxy-amine reaction group specified above adjacent one end of the molecule, while the opposite end of the molecule is devoid of such an epoxy-amine reaction group, is capable of suspending or solubilizing similar and nonsimilar insoluble high molecular weight organic resins also having a molecular weight up to approximately 10,000. The solution reaction product therefore has the formula:

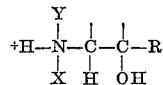

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR")$_n$OH, wherein R" is an aliphatic hydrocarbon radical having a chain length of from 1 to 6 carbon atoms and $n$ is an integer of from 1 to 25, and R is a long chain organo molecule having a molecular weight up to approximately 10,000 and devoid of the terminal group given above at its other end.

It is further obvious that various alterations, modifications and substitutions may be made in the present invention without departing from the spirit of the invention as defined by the following claims.

We claim:
1. A method of dispersing a resinous compound in water, comprising: combining said compound with at least 1% by weight of an aqueous soluble compound having the following formula:

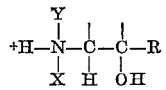

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR")$_n$OH, wherein R" is an aliphatic hydrocarbon radical having a chain length of from 1 to 6 carbon atoms and $n$ is an integer of from 1 to 25, and R is a long chain organo molecule compatible with said resinous compound having a molecular weight up to approximately 10,000 and devoid of the terminal group given above at its other end; and mixing the blend with water.

2. A method for preparing aqueous dispersions of resinous compounds comprising: combining said compounds wtih at least 1% by weight of an aqueous soluble compound having the following formula:

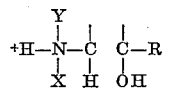

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR")$_n$OH, wherein R" is an aliphatic hydrocarbon radical having a chain length of from 1 to 6 carbon atoms and $n$ is an integer of from 1 to 25, and R is a long chain organo molecule compatible with said resinous compound having a molecular weight up to approximately 10,000 devoid of the terminal group given above at its other end, and dispersing said insoluble compound and said aqueous soluble compound in an aqueous medium.

3. An aqueous dispersion consisting essentially of an aqueous medium and an insoluble resinous compound, and at least 1% by weight of an aqueous soluble compound having the following formula:

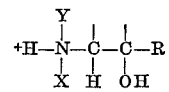

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR")$_n$OH, wherein R" is an aliphatic hydrocarbon radical having a chain length of from 1 to 6 carbon atoms and $n$ is an integer of from 1 to 25, and R is a long chain organo molecule compatible with said resinous compound having a molecular weight up to approximately 10,000 and devoid of the terminal group given above at its other end, dispersed throughout said aqueous medium.

4. A method for sizing glass fibers comprising: coating the surfaces of said fibers at the time of their formation with a material consisting essentially of an aqueous dispersion of an admixture of an insoluble resinous compound, and at least 1% by weight of an aqueous soluble compound having the following formula:

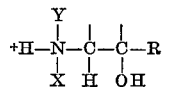

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR")$_n$OH, wherein R" is an aliphatic hydrocarbon radical having a chain length of from 1 to 6 carbon atoms and $n$ is an integer of from 1 to 25, and R is a long chain organo molecule compatible with said resinous compound having a molecular weight up to approximately 10,000 and devoid of the terminal group given above at its other end.

5. A method as claimed in claim 4 in which said resinous insoluble compound is selected from the group consisting of the glycidyl ethers of phenol, substituted phenol, diphenol, phenol-aldehyde condensates and epoxidized polyalkyladienes.

6. A method as claimed in claim 4 which said resinous insoluble compound and said soluble compound precursor are the glycidyl ethers of epichlorohydrin and para, para'-isopropylidenediphenol.

7. Glass fibers coated with the dried residue of an aqueous dispersion consisting essentially of an admixture of a resinous epoxide compound, and at least 10% by weight of an aqeuous soluble compound having the following formula:

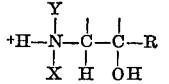

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule compatible with said resinous epoxide compound having a molecular weight up to approximately 10,000 and devoid of the terminal group given above at its other end.

8. Glass fibers as claimed in claim 7 in which said resinous epoxide compound is selected from the group consisting of the glycidyl ethers of phenol, substituted phenol, diphenol, phenol-aldehyde condensates and epoxidized polyalkadienes.

9. Glass fibers as claimed in claim 7 in which said resinous epoxide compound and said epoxide composition precursor are the glycidyl ether of epichlorohydrin and para, para′isopropylindenediphenol.

10. Glass fibers as claimed in claim 7 in which said aqueous dispersion also contains between 0.1 to 2% by weight of a water repellant selected from the group consisting of Werner chromium complexes, unsaturated organosilanes, epoxy silanes, and amino organosilanes.

11. Glass fibers as claimed in claim 7 in which said aqueous dispersion also contains a lubricant.

12. A forming size composition for glass fibers consisting essentially of an aqueous dispersion of a resinous epoxide compound and at least 10% by weight of an aqueous soluble compound having the following formula:

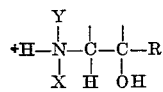

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule compatible with said resinous epoxide compound having a molecular weight up to approximately 10,000 and devoid of the terminal group given above at its other end.

13. A method for sizing glass fibers comprising: coating the surfaces of said fibers at the time of their formation with a material consisting essentially of an aqueous dispersion of the reaction product of a resinous epoxide compound and an organosilane selected from the group consisting of epoxysilanes and aminosilanes, and at least 1% by weight of an aqueous soluble compound having the following formula:

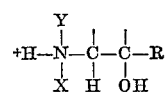

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule compatible with said compound having a molecular weight up to approximately 10,000 and devoid of the terminal group given above at its other end.

14. A method for sizing glass fibers comprising coating the surfaces of said fibers at the time of their formation with a material consisting essentially of an aqueous dispersion of a resinous epoxide compound and at least 10% by weight of the reaction product of an organosilane selected from the group consisting of epoxysilanes and aminosilanes and an aqueous soluble epoxide compound having the following formula:

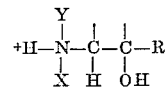

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule compatible with said compound having a molecular weight up to approximately 10,000 and devoid of the terminal group given above at its other end.

15. Glass fibers coated with the dried residue of an aqueous dispersion consisting essentially of an admixture of the reaction product of a resinous epoxide compound and an organosilane selected from the group consisting of epoxysilanes and aminosilanes, and at least 1% by weight of an aqueous soluble epoxide compound having the following formula:

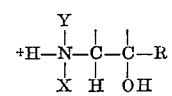

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule compatible with said compound having a molecular weight up to approximately 10,000 and devoid of the terminal group given above at its other end.

16. Glass fibers coated with the dried residue of an aqueous dispersion consisting essentially of an admixture of a resinous epoxide compound and at least 10% by weight of the reaction product of an organosilane selected from the group consisting of epoxysilanes and aminosilanes and an aqueous soluble epoxide compound having the following formula:

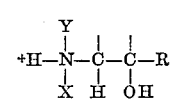

wherein Y is a member of the class consisting of hydrogen, an alkyl radical of a chain length of from 1 to 7 carbon atoms, and an X radical; and X is a member of the group consisting of: (1) an aliphatic hydrocarbon having a chain length of from 1 to 7 carbon atoms and including at least one hydroxy group, (2) —OH, and (3) —(OR″)$_n$OH, wherein R″ is an aliphatic hydrocarbon radical having a chain length of from 1 to 6 carbon atoms and $n$ is an integer of from 1 to 25, and R is a long chain organo molecule compatible with said compound having a molecular weight up to approximately 10,000 and devoid of the terminal group given above at its other end.

References Cited

UNITED STATES PATENTS

| | | | |
|---|---|---|---|
| 3,336,253 | 8/1967 | Wong et al. | 260—29.2 |
| 3,349,053 | 10/1967 | Ashby | 260—29.2 |

SAMUEL H. BLECH, *Primary Examiner.*

JOHN C. BLEUTGE, *Assistant Examiner.*

U.S. Cl. X.R.

260—29.3, 29.4, 29.6, 29.7, 32.8, 33.6, 18, 824, 826, 827, 830, 831, 834, 835, 836; 117—126, 161